United States Patent
Lebouetté et al.

(10) Patent No.: US 6,370,295 B2
(45) Date of Patent: *Apr. 9, 2002

(54) SWITCH MODULES, A SWITCH MATRIX INCLUDING SUCH MODULES, AND A NON-BLOCKING MODULAR SWITCH NETWORK INCLUDING SUCH A MATRIX

(75) Inventors: Claude Lebouetté, Bretigny sur Orge; Michel Sotom, Paris; François-Xavier Ollivier, Guibeville, all of (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/495,453

(22) Filed: Feb. 1, 2000

(30) Foreign Application Priority Data

Feb. 4, 1999 (FR) .............................. 99 01293

(51) Int. Cl.$^7$ ................................. G02B 6/35
(52) U.S. Cl. ........................... 385/17; 385/16
(58) Field of Search ..................... 385/16, 17

(56) References Cited

U.S. PATENT DOCUMENTS

| | | | | |
|---|---|---|---|---|
| 4,807,280 A | * | 2/1989 | Posner et al. | 379/272 |
| 5,032,837 A | * | 7/1991 | Yoshifuji | 340/825.8 |
| 5,729,642 A | | 3/1998 | Thaniyavarn | |
| 5,945,922 A | * | 8/1999 | Gao et al. | 340/825.8 |

FOREIGN PATENT DOCUMENTS

DE 42 17 821 A1 12/1993
EP 0 898 440 A2 2/1999

OTHER PUBLICATIONS

Collier, M. et al.: "The Strictly Non-Blocking Condition for Three-Stage Network" Fundamental Role of Teletraffic in the Evolution of Telecommunications Network, Proceedings of the 14$^{th}$ International teletraffic Congress–=ITC 1, Juan –Les–Pins, Jun. 6–10, 1994 No. vol. 1A, Jun. 6, 1994, pp. 635–644, XP000593451 Labetouille J, Roberts JW (EDS)ISBN: 0–444–82031–0.

Macdonald, R. et al.: "Multistage Optoelectronic Switch Networks" IEE Proceedings: Optoelectronics, vol. 141, No. 3, Part J., Jun. 1, 1994, pp. 173–177, XP000438862 ISSN: 1350–2433.

* cited by examiner

Primary Examiner—John D. Lee
Assistant Examiner—Jennifer Doan
(74) Attorney, Agent, or Firm—Sughrue Mion, PLLC

(57) ABSTRACT

The matrix comprises:
- a first stage having r switch modules each having $2p^2$ inlets and 2p.r outlets; and
- a second stage comprising r switch modules each having 2p.r inlets and $2p^2$ outlets.

The outlets of the first stage are connected to inlets of the second stage via links which are mutually parallel in groups of 2p links, thereby reducing the number of crossover points, and thus reducing size. If the matrix is implemented using photonic technology, these links are implemented by means of optical fiber ribbons. The invention is applicable to photonic switch networks.

9 Claims, 3 Drawing Sheets

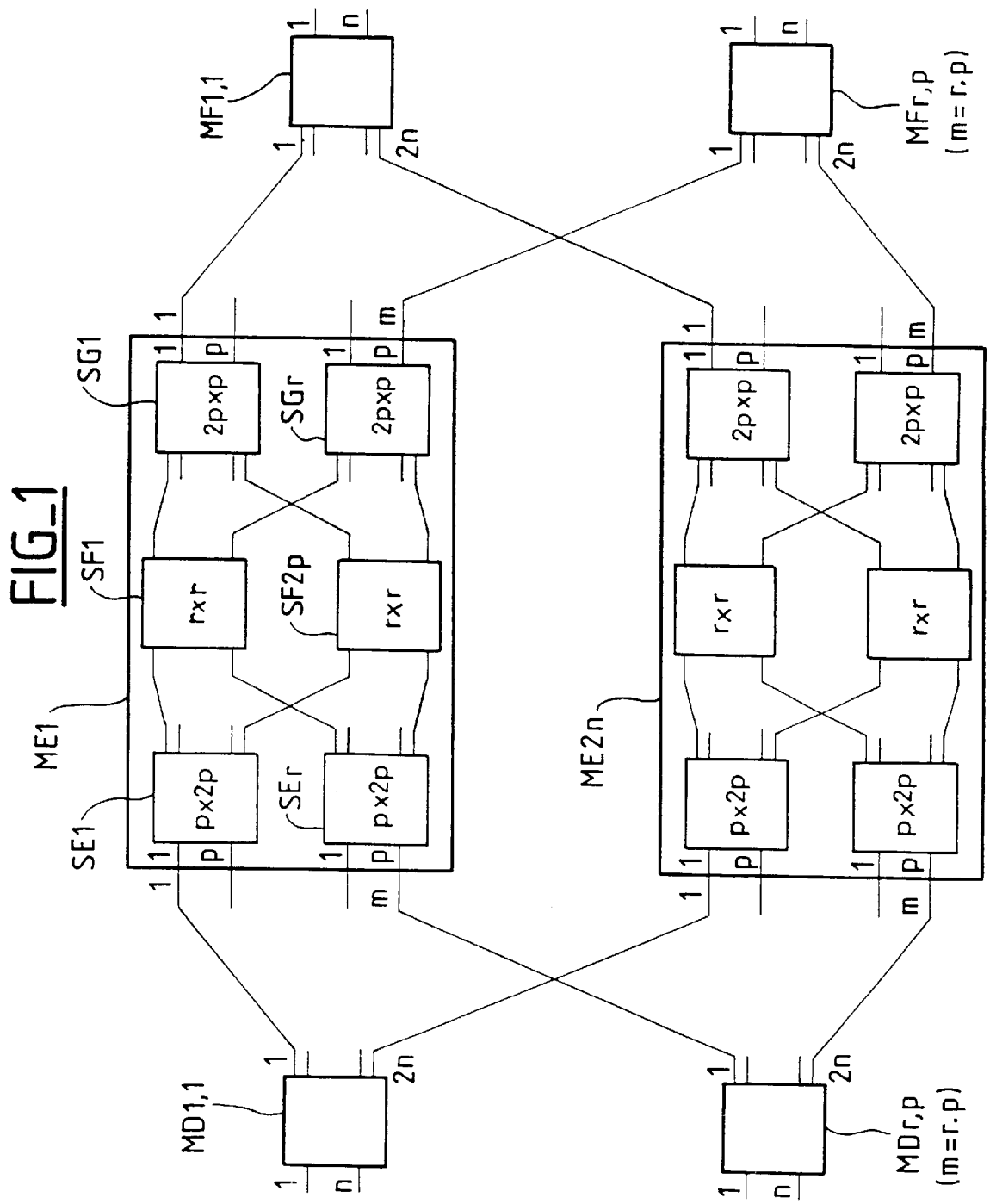
FIG_1

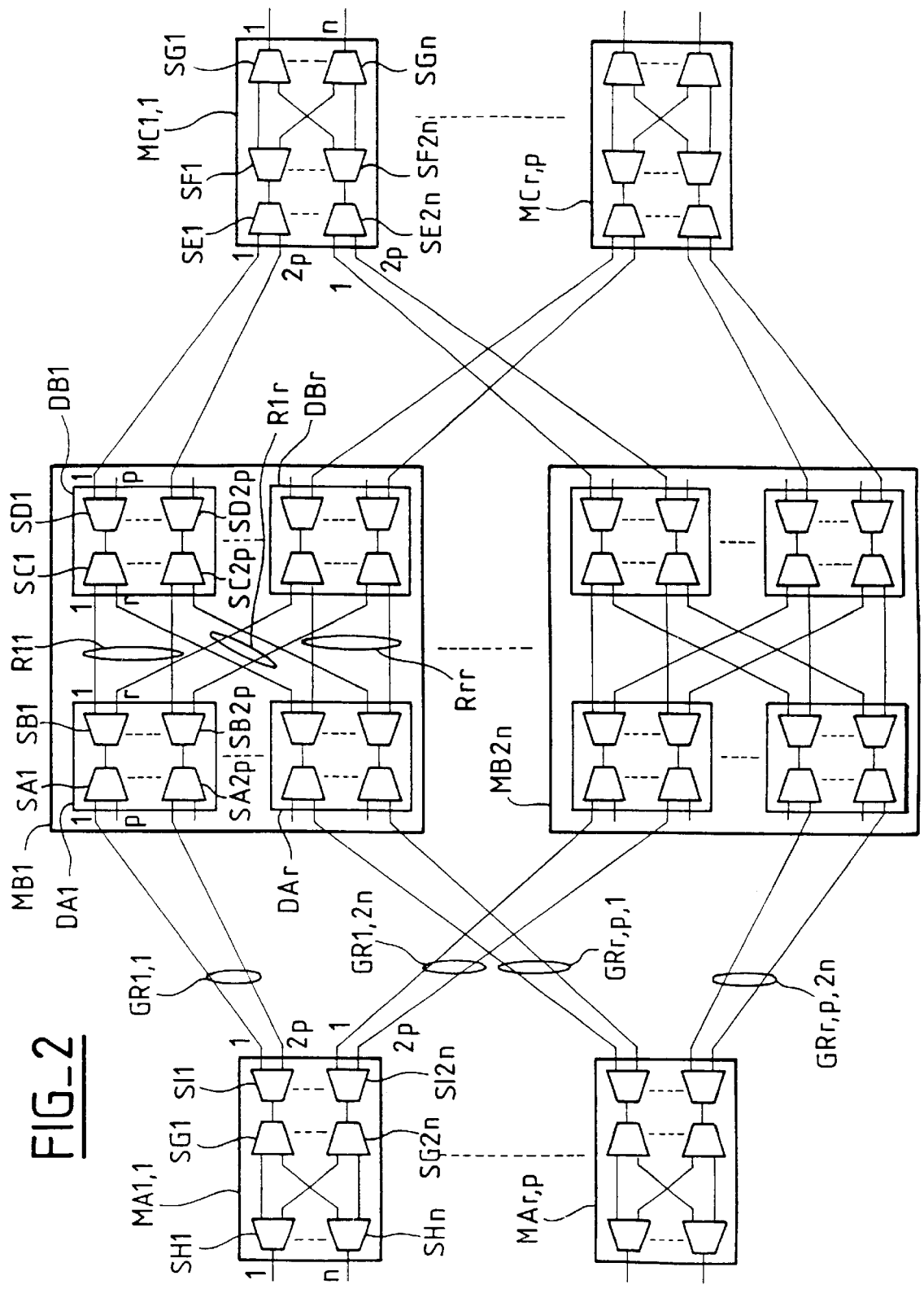
FIG_2

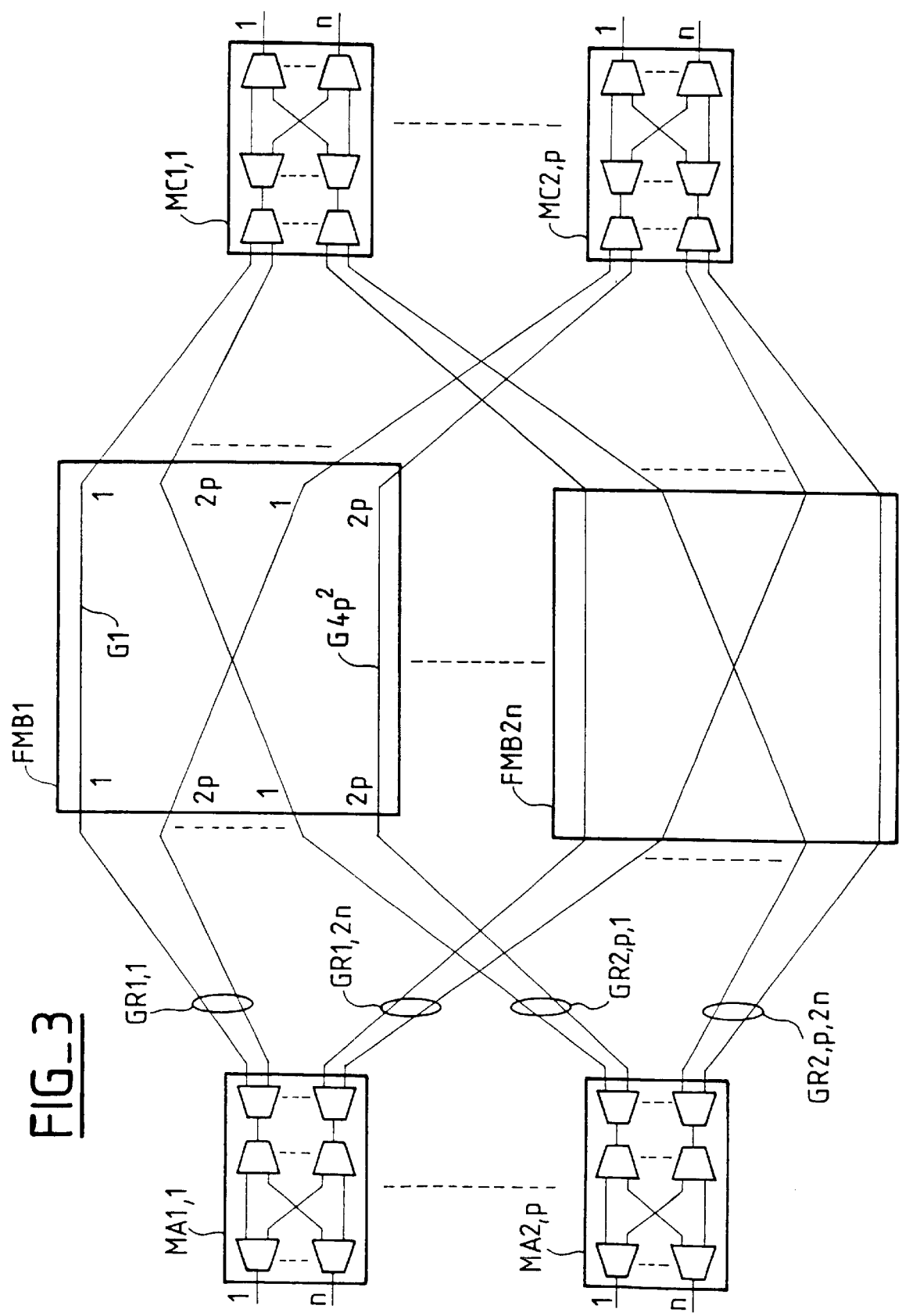
FIG_3

SWITCH MODULES, A SWITCH MATRIX INCLUDING SUCH MODULES, AND A NON-BLOCKING MODULAR SWITCH NETWORK INCLUDING SUCH A MATRIX

The invention relates to switch modules suitable for making a non-blocking switch network, more particularly adapted for photonics. Nevertheless, it can also be used for making switch networks with electronic technology.

BACKGROUND OF THE INVENTION

It is known that a non-blocking switch network having n.m inlets and n.m outlets, i.e. equivalent to a matrix having n.m inlets and n.m outlets can be made by using a plurality of stages each constituted by non-blocking switch matrices of size that is smaller than that of the network to be made. Such a non-blocking network is said to be a Clos network when it comprises:

- a first stage constituted by c matrices, each having a inlets and b outlets;
- a second stage constituted by b matrices, each having c inlets and c outlets; and
- a third stage constituted by c matrices, each having b inlets and a outlets where $b \geq 2a-1$.

By way of example, the article "Multistage optoelectronic switch networks", by R. I. MacDonald et al., 8049$_j$ IEEE Proceedings-J Optoelectronics 141 (1994) June, No. 3, Part J, Stevenage Herts., GB, describes a Clos network having n.r inlets an n.r outlets and comprising three stages:

- a first stage constituted by r matrices, each having n inlets and 2n−1 outlets;
- a second stage constituted by 2n−1 matrices, each having r inlets and r outlets; and
- a third stage constituted by r matrices, each having 2n−1 inlets and n outlets.

The 2n−1 outlets of each matrix in the first stage are connected to respective inlets of each of the 2n−1 matrices of the second stage. The 2n−1 inlets of each matrix in the third stage are connected to respective outlets from each of the 2n−1 matrices of the second stage. The r×r matrices constituting the second stage are themselves three-stage Clos networks. These r×r matrices thus comprise interconnection links between a first stage and a second stage, and also between the second stage and a third stage. When the matrices are implemented using photonic technology, such links are constituted by optical fibers which cross over at very many points. The space occupied by these crossing fibers constitutes a technological limitation which makes it impossible in practice to implement optical switch networks of size greater than 128×128. Furthermore, known Clos networks cannot be under-equipped, i.e. it is not possible to avoid installing all of the matrices in the central stage even if the full capacity of a complete network is not required immediately, and this is because known networks cannot operate if any matrix in the central stage is missing.

OBJECT AND SUMMARY OF THE INVENTION

The object of the invention is to provide a matrix capable of having greater capacity, and a switch network that can operate even if it is under-equipped.

In a first aspect, the invention provides a first type of switch module having $2p^2$ inlets and 2p.r outlets, wherein the inlets are grouped together in groups of p inlets and the outlets are grouped together in groups of r outlets, each group of inlets being associated with a single group of outlets; and wherein for each group of inlets the module includes means for establishing a connection between any one of the inlets of the group of inlets and any one of the outlets of the associated group of outlets.

In a second aspect, the invention provides a second type of switch module having 2p.r inlets and $2p^2$ outlets, wherein the inlets are grouped together in groups of r inlets and the outlets are grouped together in groups of p outlets, each group of inlets being associated with a single group of outlets; and wherein for each group of inlets the module includes means for establishing a connection between any one of the inlets of the group of inlets and any one of the outlets of the associated group of outlets.

In a third aspect, the invention provides a switch matrix having $2r.p^2$ inlets and $2r.p^2$ outlets, wherein the matrix comprises:

- a first stage comprising r switch modules of the first type; and
- a second stage comprising r switch modules of the second type;
- and wherein the r outlets of each second switch of the switch modules of the first stage are connected to respective inlets of each of the first switches of the switch modules of the second stage in such a manner that the outlet of rank i of any second switch of rank j in the switch module of rank k in the first stage of said matrix is connected to the inlet of rank k of the switch of rank j in the switch module of rank i in the second stage of the matrix.

The matrix characterized in this way has interconnections between the r modules of the first stage and the r modules of the second stage which still cross over, but which are mutually parallel in groups of 2p links. It is thus possible to use ribbons each grouping together 2p optical fibers in parallel. The number of crossovers is thus greatly reduced. The saving in bulk occupied enables matrices of larger size to be implemented, in particular 256×256 and 512×512 matrices to be implemented.

In a fourth aspect, the invention provides a non-blocking modular switch network having n.m inlets and n.m outlets, wherein the network comprises:

- a first stage having m matrices each having n inlets and 4.n.p outlets;
- a second stage of 2n matrices according to claims 5 or 6; 2p outlets of each matrix of the first stage being connected to 2p respective inlets of a switch module of the first stage of each of the 2n matrices of the second stage of the network; and
- a third stage of m matrices each having 4.n.p inlets and n outlets; 2p inlets of each matrix of the third switch being connected to 2p respective outlets of a switch module of the second switch of each of the 2n matrices of the second stage of the network.

The network characterized in this way presents the advantage of being capable of operating even if it is under-equipped.

BRIEF DESCRIPTION OF THE DRAWINGS

The invention will be better understood and other characteristics will appear more clearly on reading the following description and from the accompanying figures:

FIG. 1 is a block diagram of a network of known structure;

FIG. 2 is a block diagram of a network including matrices of the invention; and

FIG. 3 is a block diagram of the same network when under-equipped, with matrices of the invention being replaced by mere optical fiber cross-connection frames.

MORE DETAILED DESCRIPTION

The network shown in FIG. 1 is an n.m inlet by n.m outlet network. The number m is equal to r.p where r and p are two integers. This network comprises:

- a first stage constituted by m non-blocking matrices MD1,1; . . . ; MDr,p, each having n inlets and 2n outlets, the inlets constituting the inlets of the network;
- a second stage constituted by 2n non-blocking matrices ME1, . . . , ME2n, each having m inlets and m outlets; and
- a third stage constituted by m non-blocking matrices MF1,1; . . . ; MFr,p, each having 2n inlets and n outlets, the outlets constituting the outlets of the network.

The m inlets of each matrix of the second stage ME1, . . . , ME2n are connected to respective outlets of each of the matrices of the first stage MD1,1; . . . ; MDr,p. The m outlets of each matrix of the second stage ME1, . . . , ME2n, are connected to respective inlets of each of the matrices of the third stage MF1,1; . . . ; MFr,p.

All of the matrices of the second stage have the same conventional structure. For example, the matrix ME1 comprises:

- a first stage constituted by r non-blocking matrices SE1, . . . , SEr, each having p inlets and 2p outlets;
- a second stage constituted by 2p non-blocking matrices SF1, . . . , SFp2, each having r inlets and r outlets; and
- a third stage constituted by r non-blocking matrices SG1, . . . , SGr, each having 2p inputs and p outlets.

The 2p outlets from each matrix SE1, . . . , SEr of the first stage are connected to respective inlets in each of the matrices SF1, . . . , SF2p of the second stage. The r outlets of each matrix SF1, . . . , SF2p of the second stage are connected to-respective inlets of each of the matrices SG1, . . . , SGr of the third stage. Each link is provided by means of an optical fiber that is independent of the others since the links leaving a given matrix are never parallel to one another, but diverge.

It should be observed that these interconnections have a very large number of crossovers, since they are never parallel to one another. This gives rise to an increasing amount of space being occupied with increasing capacity of the matrices ME1, . . . , ME2n, and in the end it is this requirement for space that puts a limit on the possibility of making a large-capacity network by combining a plurality of these matrices in a network.

FIG. 2 is a block diagram of a non-blocking switch network having n.m inlets and n.m outlets, but using matrices of the invention. The number m is equal to r.p where r and p are two integers. This network comprises:

- a first stage of m blocking matrices MA1,1; . . . ; MAs,t (not shown); . . . ; MAr,p, each having n inlets and 4.n.p outlets;
- a second stage of 2n blocking matrices MB1, . . . , MBj (not shown), . . . , MB2n, each having $2p^2r$ inlets and $2p^2r$ outlets, and having the structure of the invention; and
- a third stage of m blocking matrices MC1,1; . . . ; MCi,v (not shown); . . . ; MCr,p each having 4.n.p inlets and n outlets.

The first stage is connected to the second stage by 2n groups of links for each inlet module, e.g. GR1,1; . . . ; GR1,2n for the module MA1,1; and GRr,p,1; . . . ; GRr,p,2n for the module MAr,p. The second stage is connected to the third stage by other groups of links which are symmetrical to the above.

The matrices MB1, . . . , MBj (not shown), . . . , MB2n of the second stage all have the same structure. For example, the matrix MB1 comprises:

- a first stage having r switch modules DA1, . . . , DAr each having $2p^2$ inlets and 2p.r outlets; and
- a second stage comprising r switch modules DB1, . . . , DBr each having 2p.r inlets and $2p^2$ outlets.

The r switch modules DA1, . . . , DAs (not shown), . . . , DAr of the first switch of the switch matrix MB1 all have the same structure. For example, the module DA1 comprises:

- 2p first switches SA1, . . . , SAi (not shown), . . . , SA2p, each having p inlets and one outlet; and
- 2p second switches SB1, . . . , SBj (not shown), . . . , SB2p, each having one inlet and r outlets; these second switches are respectively associated with the first switches SA1, . . . , SA2p, with the outlet of a first switch being connected to the inlet of a second switch associated therewith.

The r switch modules DB1, . . . , DBr of the first stage of the matrix MB1 all have the same structure. For example, the module DB1 comprises:

- 2p first switches SC1, . . . , SCj (not shown), . . . , SC2p, each having r inlets and one outlet; and
- 2p second switches SD1, . . . , SDu (not shown), . . . , SD2p, each having one inlet and p outlets, the outlet of a first switch being connected to the inlet of a second switch which is associated therewith.

The interconnections between the first and second stages of the matrix MB1, taken as an example, are as follows.

The r outlets of each switch SB1, . . . , SB2p of each switch module DA1, . . . , DAr of the first stage are connected to respective inlets of each of the switch modules DB1, . . . , DBr of the second stage. By way of example, we consider more particularly the interconnections between the outlets of ranks 1, . . . , i, . . . , r of the switch SB1 and the inlets of the switch modules DB1, . . . , DBr:

- the outlet of rank 1 from switch SB1 is connected to the inlet of rank 1 of the corresponding switch of SC1 in switch module DB1;
- the outlet of rank i of switch SB1 is connected to the inlet of rank 1 of the corresponding switch of SC1 in the switch module DBi (not shown); and
- the outlet of rank r of switch SB1 is connected to the inlet of rank 1 of the corresponding switch of SC1 in the switch module DBr.

We also consider the interconnections between the outlets of ranks 1, . . . , i, . . . , r of switch SB2p of the same switch module DA1, and the inlets of the switch modules DB1, . . . , DBr:

- the outlet of rank 1 of switch SB2p is connected to the inlet of rank 1 of the switch SC2p in switch module DB1;
- the outlet of rank i of switch SB2p is connected to the inlet of rank 1 of the corresponding switch of SC2p in switch module DBi (not shown); and
- the outlet of rank r of switch SB2p is connected to the inlet of rank 1 of the corresponding switch of SC2p in switch module DBr.

The links are parallel to one another in groups of 2p links. These links are implemented by means of ribbons each having 2p parallel optical fibers. For example, the module DA1 is connected to the modules DB1, . . . , DBr by r ribbons R11, . . . , R1r. The reduction in the number of crossovers and the use of optical fiber ribbons considerably reduces the space occupied by the interconnections, thereby making it possible to implement matrices that are more compact.

In general, in a matrix MBj for j=1, . . . , 2n, the outlet of rank i of switch SBj (not shown) of switch module DAk (not shown) is connected to the inlet of rank k of switch SCj (not shown) in switch module DBi (not shown), for i=1 to r; j=1 to 2p; k=1 to r.

By way of example, each matrix of the first stage MA1,1 comprises:

- a first stage of n switches SH1, . . . , SH2n, each having one inlet and 2n outlets, said inlet constituting one of the inlets of the network;
- a second stage of 2n switches SG1, . . . , SG2n, each having n inlets and one outlet; and
- a third stage of 2n switches SI1, . . . , SIj (not shown), . . . , SI2n, each having one inlet and 2p outlets.

Each of the 2n outlets of a switch of the first stage SH1, . . . , SH2n is connected to a respective inlet of each of the switches of the second stage SG1, . . . , SG2n. The outlet of each switch of the second stage SG1, . . . , SG2n is connected to a respective inlet of a switch of the third stage SI1, . . . , SI2n.

The 2p outlets of the switch SI1 of the matrix MA1,1 of the first stage are connected to 2p respective inlets of the switch module DA1 of the matrix MB1 of the second stage of the network. More precisely, they are connected to respective inlets of rank 1 in each of the switches SA1, . . . , SA2p of the device DA1.

The 2p outlets of the switch SI2n of the matrix MA1,1 of the first stage are connected to 2p respective inlets of a switch module corresponding to the device DA1 but located in the matrix MB2n of the second stage of the network. More precisely, they are connected to respective inlets of rank 1 in each of the corresponding switches of the switches SA1, . . . , SA2p in the switch module corresponding to the device DA1 but in the matrix MB2n.

In general, the outlet of rank i of switch SIj (not shown) of the matrix MAs,t (not shown) of the first stage is connected to the inlet of rank t amongst the 2p inlets of a switch (not shown) corresponding to SAi but in the corresponding switch module of DAs (not shown) in the matrix MBj (not shown) of the second stage of the network for i=1 to 2p; j=1 to 2n; t=1 to p; s=1 to r.

The m blocking matrices MC1,1; . . . ; MCr,p each having 4.n.p inlets and n outlets are all of the same structure. By way of example, the matrix MC1,1 comprises:

- a first stage of 2n switches SE1, . . . , SEj (not shown), . . . , SE2n, each having 2p inlets and one outlet;
- a second stage of 2n switches SF1, . . . , SF2n, each having one inlet and n outlets; and
- a third stage of n switches SG1, . . . , SG2n, each having 2n inlets and one outlet, each outlet constituting an outlet of the network.

The inlet of each switch in the second stage SF1, . . . , SF2n is connected to a respective outlet of a switch in the third stage SE1, . . . , SE2n. Each of the 2n inlets of a switch of the third stage SG1, . . . , SG2n is connected to a respective outlet of each of the switches of the second stage SF1, . . . , SF2n.

2p inlets of each matrix MC1,1; . . . ; MCi,v (not shown); . . . ; MCr,p of the third stage are connected to 2p respective outlets of a switch analogous respectively to SD1, . . . , SDq (not shown), . . . , SD2p in each switch module DB1, . . . , DBi (not shown), . . . , DBr of the second stage of the matrix MB1. More precisely, the inlet of rank q of switch SEj (not shown) of matrix MCi,v (not shown) of the third stage of the network is connected to the outlet of rank v of the switch SDq (not shown) of the switch module DBi (not shown) of the matrix MBj (not shown) of the second stage of the network for q=1 to 2p; v=1 to p; i=1 to r; j=1 to 2n.

FIG. 3 is a block diagram showing the same network for only 2np inlets and 2np outlets. It is then under-equipped by replacing the matrices MB1, . . . , MB2n by mere optical fiber cross-connect frames FMB1, . . . , FBM2n; using only m=2p modules MA1,1; . . . ; MA2,p in the first stage; and using only m=2p modules MC1,1; . . . ; MC2,p in the third stage.

The first stage is connected to the second stage by the 4np groups of 2p links: GR1,1; . . . ; GR1,2n; . . . , GR2,p,1; . . . ; GR2,p,2n. The second stage is connected to the third stage by 4np groups of 2p links, these groups being symmetrical to the above groups. This provides a two-stage Clos network.

The matrices MB1, . . . , MB2n and the optical fiber cross-connect frames FMB1, . . . , FMB2n are fitted with optical connectors making them easy to plug in and to remove from the frame supporting the network. The capacity of the network of the invention can thus be increased over time, depending on requirements, by replacing the cross-connect frames FMB1, . . . , FMB2n with matrices MB1, . . . , MB2n so as to increase the capacity of the network up to its maximum capacity of nrp inlets and nrp outlets.

Each optical fiber cross-connect frame FMB1, . . . , FBM2n has $4p^2$ optical inlets and $4p^2$ optical outlets. Each inlet is permanently connected to a respective outlet by means of a light guide. There are thus $4p^2$ light guides G1, . . . , G4$p^2$ each of which is constituted by an optical fiber in this embodiment.

If the required number of inlets/outlets is less than 2np, it is possible to start with n inlets and n outlets, by equipping only MA1,1 and MC1,1, after which the number of modules can be increased up to 2p so as to increase the capacity of the network up to 2np inlets and 2np outlets, in steps of size n. In all cases, the 2n optical fiber cross-connect frames FMB1, . . . , FMB2n are fitted.

To increase capacity further, the optical fiber cross-connect frames FMB1, . . . , FBM2n are replaced by 2n matrices MB1, . . . , MB2n which are equipped progressively with modules DA1, . . . , DAr and DB1, . . . , DBr as a function of the desired number of inlets and outlets.

For example, to have np inlets and np outlets, the following are used: p modules MA1,1; . . . ; MA1,p; one row DA1-DB1 in each matrix MB1, . . . , MB2n; and p outlet modules MC1,1; . . . , MC1,p.

To have np+1 to 2np inlets/outlets, the following are used: p+1 to 2p modules MA1,1; . . . ; MA1,p+1 (up to MA1,2p); two rows DA1-DB1, DA2-DB2 in each matrix MB1; . . . ; MB2; and p+1 to 2p outlet modules MC1,1; . . . ; MC1,p+1 (up to MC1,2p).

Thereafter, one row is added in each matrix MB1, . . . , MB2n for each increase of np inlets/outlets.

The network of the invention can be made using matrices of a-different type to constitute the first stage MA1,1; . . . ; MAr,p providing they are matrices having n inlets and 4n.p outlets, thus making it possible to establish at least one connection between each of the 2n groups of 2p outlets and any one of the n inlets.

The network of the invention can be made with matrices of another type for constituting the third stage MC1,1; . . . ; MCr,p providing they are matrices having 4n.p inlets and n outlets, making it possible to establish at least one connection between each of the 2n groups of 2p inlets and any one of the n outlets.

What is claimed is:

1. A switch module having $2p^2$ inlets and 2p.r outlets,
   wherein the number of inlets is independent from the number of outlets;
   wherein the inlets are grouped together in groups of p inlets and the outlets are grouped together in groups of r outlets, each group of inlets being associated with a single group of outlets;
   wherein for each group of inlets the module includes means for establishing a connection between any one of the inlets of the group of inlets and any one of the outlets of the associated group of outlets; and:
   wherein the means for establishing a connection between any one of the inlets of a group of inlets and any one of the outlets of the associated group of outlets comprise:
      a first switch having p inlets and one outlet, said inlets constituting inlets of the module; and
      a second switch having one inlet and r outlets, the outlet of the first switch being connected to the inlet of the second switch associated therewith, and the outlets of the second switch constituting the outlets of the module.

2. A switch module having 2p.r inlets and $2p^2$ outlets,
   wherein the number of inlets is independent from the number of outlets;
   wherein the inlets are grouped together in groups of r inlets and the outlets are grouped together in groups of p outlets, each group of inlets being associated with a single group of outlets;
   wherein for each group of inlets the module includes means for establishing a connection between any one of the inlets of the group of inlets and any one of the outlets of the associated group of outlets; and
   wherein the means for establishing a connection between any one of the inlets of a group of inlets and any one of the outlets of the associated group of outlets comprise:
      a first switch having r inlets and one outlet, the inlets constituting the inlets of the module; and
      a second switch having one inlet and p outlets, the outlet of the first switch being connected to the inlet of the second switch associated therewith, and the outlets of the second switch constituting the outlets of the module.

3. A switch matrix having $2r.p^2$ inlets and $2r.p^2$ outlets, wherein the matrix comprises:
   a first stage comprising r switch modules wherein each of said switch modules have $2p^2$ inlets and 2p.r outlets, wherein the inlets are grouped together in groups of p inlets and the outlets are grouped together in groups of r outlets, each group of inlets being associated with a single group of outlets; and wherein for each group of inlets the module includes means for establishing a connection between any one of the inlets of the group of inlets and any one of the outlets of the associated group of outlets; and
   a second stage comprising r switch modules wherein each of said switch modules have 2p.r inlets and $2p^2$ outlets, wherein the inlets are grouped together in groups of r inlets and the outlets are grouped together in groups of p outlets, each group of inlets being associated with a single group of outlets; and wherein for each group of inlets the module includes means for establishing a connection between any one of the inlets of the group of inlets and any one of the outlets of the associated group of outlets;
   wherein the r outlets of each second switch of the switch modules of the first stage are connected to respective inlets of each of the first switches of the switch modules of the second stage in such a manner that the outlet of rank i of any second switch of rank j in the switch module of rank k in the first stage of said matrix is connected to the inlet of rank k of the switch of rank i in the switch module of rank i in the second stage of the matrix;
   wherein i, j and k are integers; and
   wherein rank is defined as a numerically ordered position.

4. A switch matrix according to claim 3, for optical components, wherein the r outlets of each second switch of each switch module of the first stage of the matrix are connected to respective inlets of each of the first switches of the switch modules of the second stage by means of a plurality of ribbons each comprising 2p optical fibers in parallel.

5. A non-blocking modular switch network having n.m inlets and n.m outlets, wherein the network comprises:
   a first stage having m matrices each having n inlets and 4.n.p outlets;
   a second stage of 2n matrices according to claim 3; 2p outlets of each matrix of the first stage being connected to 2p respective inlets of a switch module of the first stage of each of the 2n matrices of the second stage of the network; and
   a third stage of m matrices each having 4.n.p inlets and n outlets; 2p inlets of each matrix of the third switch being connected to 2p respective outlets of a switch module of the second switch of each of the 2n matrices of the second stage of the network.

6. An optical fiber cross-connect frame for replacing a matrix of the second stage of the network according to claim 5, wherein the frame has $4p^2$ optical inlets and $4p^2$ optical outlets respectively interconnected in permanent manner by $4p^2$ light guides, and wherein these inlets and outlets are provide with connectors enabling the entire optical fiber cross-connect frame to be plugged into the place of a matrix of the second stage of the network according to claim 7, and to be unplugged therefrom.

7. A non-blocking modular switch network having 2n.p inlets and 2n.p outlets, wherein the network comprises:
   a first stage having 2p matrices each having n inlets and 4.n.p outlets;
   a second stage-of 2n frames according to claim 6; 2p outlets of each matrix of the first stage being connected to 2p respective inlets of each of the 2n frames of the second stage of the network; and
   a third stage of 2p matrices each having 4.n.p inlets and n outlets; 2p inlets of each matrix of the third stage being connected to 2p respective outlets of each of the 2n frames of the second stage of the network.

8. A network according to claim 5, wherein each of the m matrices each having n inlets and 4.n.p outlets of the first stage of said network comprises:
   a first stage of n switches each having one inlet and 2n outlets;
   a second stage of 2n switches each having n inlets and one outlet; and a third stage of 2n switches each having one input and 2p outlets;
   wherein each of the 2n outlets of a switch of the first stage is connected to a respective inlet of each of the switches of the second stage; and
   wherein the outlet of each switch of the second stage is connected to a respective inlet of a switch of the third stage.

9. A network according to claim 5, wherein each of the m matrices having 4.n.p inlets and n outlets in the third stage of the network comprises:
   a first stage of 2n switches each having 2p inlets and one outlet;
   a second stage of 2n switches each having one inlet and n outlets; and
   a third stage of n switches each having 2n inlets and one outlet;
      wherein the inlet of each of the switches of the second stage is connected to a respective outlet of a switch of the first stage; and
      wherein each of the 2n inlets of a switch of the third stage is connected to a respective outlet of each of the switches of the second stage.

* * * * *